United States Patent [19]

Schröder

[11] Patent Number: 5,801,539
[45] Date of Patent: Sep. 1, 1998

[54] MOISTURE SENSOR FOR A WINDSHIELD

[75] Inventor: Hans-Joachim Schröder, Wiesbaden, Germany

[73] Assignee: VDO Adolf Schindling AG, Frankfurt, Germany

[21] Appl. No.: 739,560

[22] Filed: Oct. 30, 1996

[30] Foreign Application Priority Data

Dec. 20, 1995 [DE] Germany .................. 195 47 681.6

[51] Int. Cl.⁶ .................................................. B60S 11/08
[52] U.S. Cl. .................... 324/694; 318/483; 324/690
[58] Field of Search ........................... 324/694, 690; 318/444, 483, DIG. 2; 340/604, 605

[56] References Cited

U.S. PATENT DOCUMENTS

| | | | |
|---|---|---|---|
| 2,907,841 | 10/1959 | Campbell | 324/694 |
| 4,827,198 | 5/1989 | Mueller et al. | 318/483 |
| 5,057,754 | 10/1991 | Bell | 318/483 |
| 5,304,936 | 4/1994 | Buschur | 324/694 |
| 5,306,992 | 4/1994 | Droge | 318/483 |
| 5,317,252 | 5/1994 | Kranbuehl | 324/690 |
| 5,331,287 | 7/1994 | Yamagishi et al. | 324/694 |
| 5,459,380 | 10/1995 | Augustinowicz | 318/483 |
| 5,668,478 | 9/1997 | Buschur | 324/660 |

*Primary Examiner*—Maura K. Regan
*Attorney, Agent, or Firm*—Martin A. Farber

[57] ABSTRACT

A moisture sensor has two spaced main electrodes which are arranged on the outer side of the windshield of a motor vehicle in a region which is passed over by the windshield wiper and are connected to an evaluation circuit for the determination of resistance as a function of a degree of moisture. In order to improve the precision of the measurement results supplied by the moisture sensor, an auxiliary electrode is arranged between the two main electrodes outside a region passed over by the wiper in order to determine a shunt resistance formed by residues on the windshield and/or in the region of a windshield gasket covering. The main electrodes and the auxiliary electrode lead to an evaluation circuit.

15 Claims, 3 Drawing Sheets

MOISTURE SENSOR FOR A WINDSHIELD

FIELD AND BACKGROUND OF THE INVENTION

The present invention relates to a moisture sensor having two spaced main electrodes which are arranged on the outer side of the windshield of a motor vehicle in a region which is passed over by the windshield wiper, and are connected to an evaluation circuit for determining the resistance as a function of the degree of moisture.

It is known to arrange moisture sensors on the windshield of a motor vehicle within the region of the windshield wiper.

These moisture sensors supply an electric signal, as a function of the degree of wetness present at the time on the windshield, to an evaluation circuit contained within the motor vehicle.

These signals are ordinarily used to control the windshield wiper.

In the case of sensors which are arranged on the outer side of the windshield, the conductive paths are conducted into the inside of the vehicle over the edge of the windshield. The windshield is, as is known, subjected to the action of water and dirt. By the action of the windshield wiper, deposits of water and salts are formed especially on the upper edge of the windshield, which edge is generally limited by a windshield gasket.

The metallic character of the conductive paths together with deposits of water and salt which accumulate at these places leads to undefined conditions which affect the resistance of the moisture sensor.

It is generally attempted to prevent these phenomena by lacquer coatings. These phenomena are, however, thereby merely shifted to the conductive-path/lacquer-covering interface.

SUMMARY OF THE INVENTION

It is an object of the invention to improve the precision of the measurement results supplied by the moisture sensor.

In accordance with the invention, in order to determine a shunt resistance formed by residues on the windshield (2) and/or in the region of a windshield covering a gasket (6), an auxiliary electrode (5) is arranged between the two main electrodes (3, 3') and outside of the region which is passed over by the windshield wiper, the main electrodes (3, 3') and the auxiliary electrode (5) leading to the evaluation circuit.

The resistance to be ascribed to the electric shunt can be advantageously determined in this way, and the measurement signal supplied by the moisture sensor corrected. This can be done by the same evaluation circuit as also determines the amount of moisture on the windshield.

In order to be certain that only the shunt resistance is determined, the auxiliary electrode (5) is arranged in the direct vicinity of the upper edge (4) of the windshield.

The auxiliary electrode is ordinarily arranged partly below the windshield covering.

In one development, the auxiliary electrode (5) is arranged completely below the windshield covering (6). In this case, only the shunt resistance which is due to the residues in the region of the windshield covering is measured.

In a further development, the auxiliary electrode (5) is arranged approximately halfway between the two main electrodes (3, 3') on the windshield (2). In this case, the resistance measured between the auxiliary electrode and a main electrode is determined by the evaluation circuit. The exact shunt resistance formed between the two main electrodes can then be determined by simple doubling by the evaluation circuit if it is assumed that the effect of the dirtying is the same all over the sensor.

Another advantage of the invention is that the auxiliary electrode can be produced without great expense together with the moisture sensor proper, which is effected by a simple change in the layout.

According to a feature of the invention, the width of at least one main electrode (1, 1'; 3, 3') and/or of the auxiliary electrode (5) is not constant over its length.

According to a feature of the invention, the width of the main electrode (1, 1'; 3, 3') and/or of the auxiliary electrode (5) changes over its entire length.

According to a feature of the invention, at least one edge of the main electrode (1, 1'; 3, 3') and/or of the auxiliary electrode (5) is developed in undulated and/or meandering shape.

Further according to a feature of the invention, the conductive electrodes (1, 1'; 3, 3') can be produced on the windshield (2) by a sputter-etching process, a thick film process, a foil bearing a conductive structure, or by ion implantation.

The main electrodes (1, 1'; 3, 3') and auxiliary electrode (5) produced in this manner are advantageously conducted around the edge (4) of the windshield (2) onto the inner surface of the windshield, to which the evaluation circuit can be connected.

According to a feature of the invention, a layer of solder (23) is applied to the windshield (2) in the region of the electrodes for the contacting of the electrodes (1, 1'; 3, 3') with respective electric contacts of the evaluation circuit.

According to a feature of the invention, the solder layer can be fastened to the windshield (2) by ultrasonics.

Still according to a feature of the invention, the solder layer (23) is glass or silver frit which can be burned onto the windshield (2).

BRIEF DESCRIPTION OF THE DRAWINGS

With the above and other objects and advantages in view, the present invention will be more clearly understood in connection with the detailed description of the preferred embodiments when considered with the accompanying drawing, of which.

DETAILED DESCRIPTION OF THE PREFERRED EMBODIMENTS

Figure 1:
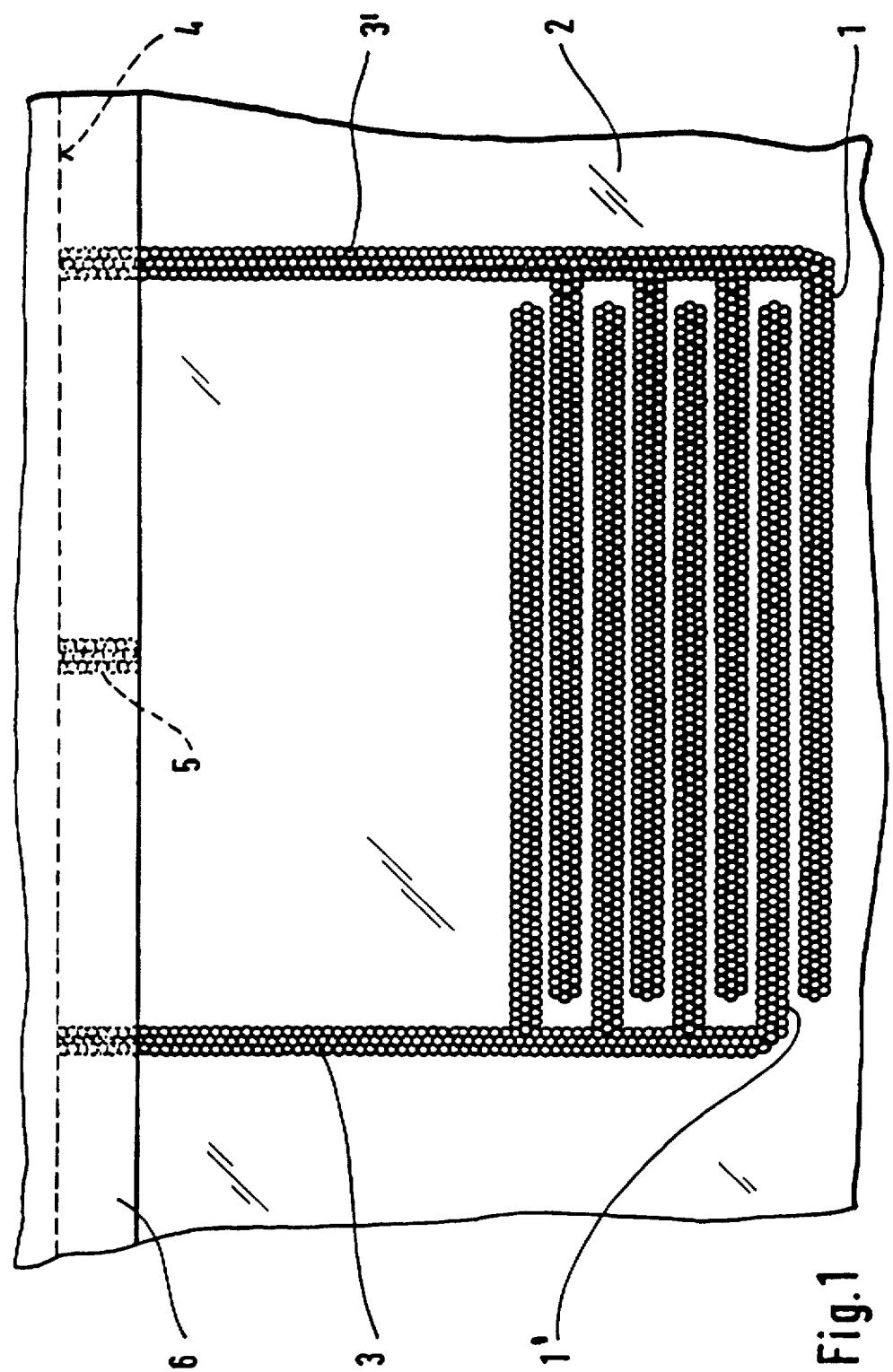
FIG. 1 is a view of a moisture sensor in accordance with the invention.

The moisture sensor shown in FIG. 1 comprises two main electrodes 1 and 1', developed as electrically conductive resistance layers, and applied onto the outer surface of a windshield 2. The electrodes 1 and 1' are developed in comb-like manner and engage into each other with the teeth of their combs so that only slits of slight width are present between the teeth. Each main electrode 1 and 1' has a respective connecting part 3 or 3' which is guided over the upper edge 4 of the windshield 2 onto the inner surface of the windshield 2 and to which different electric potentials can be connected.

When the windshield is dry, there is sufficient electrical insulation due to the space between the main electrodes 1 and 1'. The sensor structure shown thus has a high total resistance when dry.

The evaluation circuit for controlling the windshield wiper monitors the change in the total resistance of the sensor structure, which decreases with increasing moisture.

By conductive bridging of the slits between the teeth 1, 1' by drops of water which impinge on the windshield 2, a conductive connection between the teeth 1, 1' is produced between the teeth 1, 1'. Detectable resistance of the waterdrop conductive connection depends on the number of drops of water bridging the slits.

The teeth of the electrodes 1 and 1' can have a width on the order of magnitude of 1000 μm and the slits between the teeth can have a width on the order of magnitude of 400 pm. Respective ones of the main electrodes 1 and 1', including the connecting parts 3 and 3', comprise preferably layers of chromium and chromium nitride. The layers are a few atomic layers thick and are applied preferably by a sputter-etching process to the windshield. However, other methods of production, such as ion implantation, thick-foil processes, or application by a foil bearing conductive structure may be employed.

In the center between the two main electrodes 3 and 3', there is arranged an auxiliary electrode 5 which also is conducted over the upper edge 4 of the windshield 2 onto the inner surface of the windshield 2.

The main electrodes 1 and 1' including the connecting parts 3 and 3' as well as the auxiliary electrode 5 are developed in undulating fashion over their entire lengths so that the widths of the conductive paths continuously vary in these sections. By this undulating development of the edges of the electrodes, the effective length and effective cross section of a conductive path is changed which results in a change in the total resistance of the sensor.

The electrodes 1, 1', 5 are lengthened geometrically in accordance with the outer contour selected. When developed as semicircles arranged in rows alongside of each other, a lengthening of the conductive paths by a factor of π/2 is obtained.

Ordinary resistance structures have an area of 70–80 cm², the effective length of the conductive paths being approximately 6 m. For the same area, the effective length of the resistance structure developed in accordance with the invention is about 10 m.

There is also the possibility of developing only the teeth of the main electrodes 1 and 1' in this manner.

The sensor structure shown in FIG. 1 is produced by the aforementioned sputter-etching process. The grid points forming the principal and auxiliary electrodes are in this connection transparent.

For a contacting with the corresponding electric contact of the evaluation circuit, a layer of solder 23 (FIG. 2) in the form a silver of glass frit, which can be burned in place, is applied onto the corresponding main and/or auxiliary electrodes 3, 3', 5. The solder layer 23 can, however, also be attached to the windshield 2 by ultrasonics.

Figure 2:
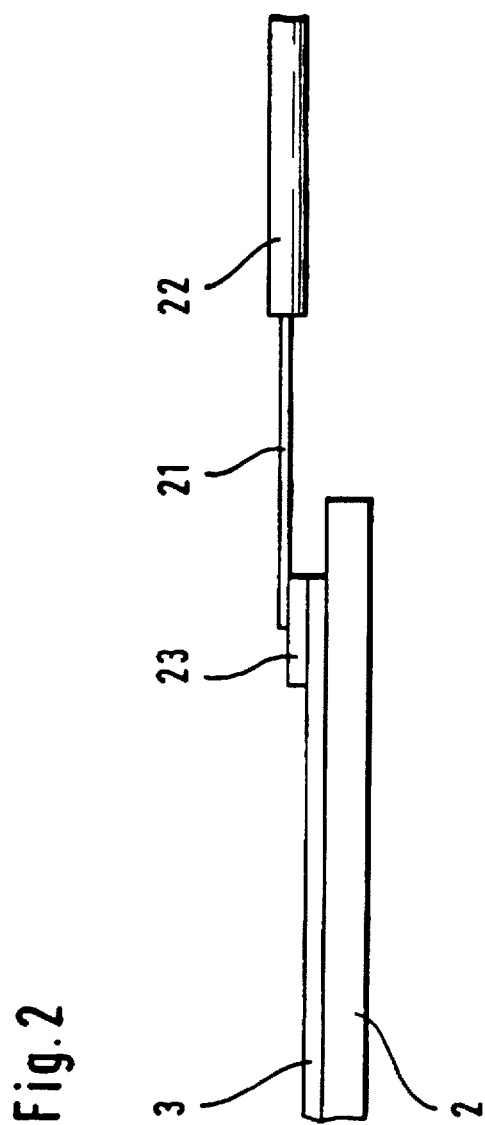
FIG. 2 is a diagram showing the contacting of the electrodes of the moisture sensor.

In FIG. 2 this type of contacting is shown on the main electrode 3 as example. The solder layer 23, via a solder point, connects the connecting part 3 of main electrode 1 to the wire 21 of a cable 22 which leads to an evaluation circuit (to be described in FIG. 3).

In order that only the shunt resistance formed by the depositing of water and salt on the windshield at the upper edge of the vehicle is measured, the auxiliary electrode 5 is arranged below a rubber gasket 6 which covers the edge 4 of the windshield 2. In this way, assurance is furthermore had that the auxiliary electrode does not have any electric contact with the main electrodes.

Figure 3:
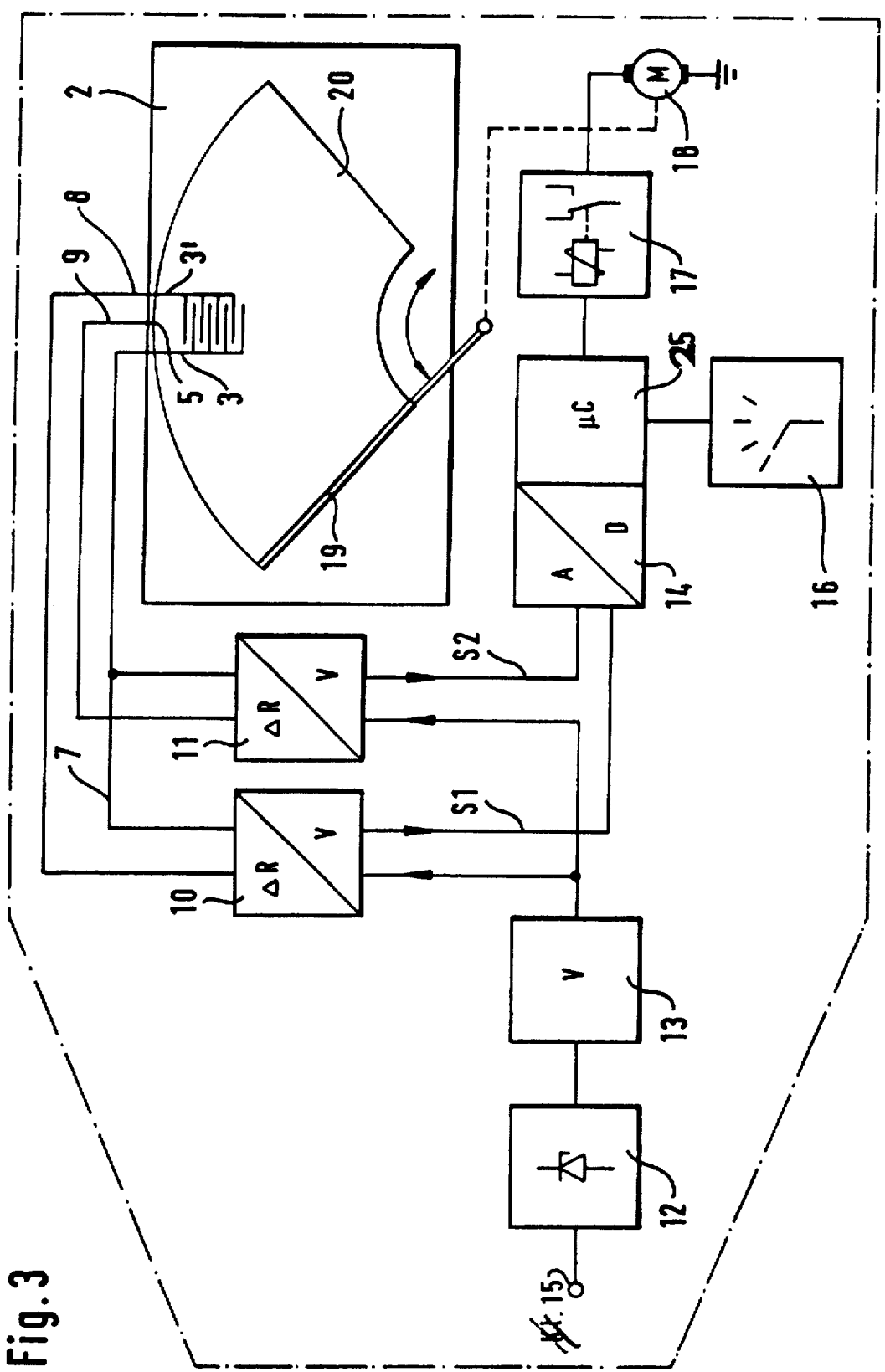
FIG. 3 is a block diagram including the moisture sensor for the control of the windshield wiper of a motor vehicle.

In accordance with the system shown in FIG. 3, the degree of the wetting of the windshield is determined by means of the resistive sensor, the connecting parts 3 and 3' of the main electrodes 1 and 1' being connected by lines 7 and 8 to a circuit 10 which, in known manner, converts a change in resistance caused by the moisture on the windshield 2 into an electric voltage signal S1.

The auxiliary electrode 5 extends via the line 9 together with the connecting part 3 of the main electrode 1 to a circuit 11 which operates in a manner similar to the circuit 10 to convert the partial resistance which changes as a function of the water and salt residues into an electric voltage signal S2.

Operating voltage is fed to the two circuits 10 and 11 via the terminal 15 of the vehicle's electrical system via a noise-voltage filter 12 and via a stabilization circuit 13. The output voltages S1 and S2 of the circuits 10 and 11 are fed to an analog-digital converter 13 of a microcomputer (microprocessor) 25. The circuits 10 and 11 in conjunction with the microcomputer 25 constitute an evaluation circuit and serve to evaluate resistance of the moisture sensor as a function of the degree of moisture.

The microcomputer 15 is connected to an operating switch 16 which is preferably developed as a steering-column switch and has detent positions for continuous operation and automatic operation. Via a relay stage 17 the windshield wiper motor 18 is connected to the output of the microcomputer 25. The wiper motor 18 is connected via a drive 26 in known manner to a wiper arm 19 which moves over the field 20 to be wiped.

At uniform time intervals, the microcomputer 25 evaluates the signals S1 and S2. Since, assuming that the water and salt deposits occur uniformly between the main electrodes and, if the auxiliary electrode 5 is arranged in the center between the connecting parts 3 and 3' of the main electrodes, the signal S2 corresponds to half the shunt resistance. The measured value after being doubled is deducted at the microcomputer 25 from the total resistance of the sensor structure represented by the signal S1. The windshield wiper 19 is controlled as a function of this difference. The microcomputer 25 in this connection effects the measurement and the correction of the measured values.

I claim:

1. A moisture sensor comprising:

two spaced-apart main electrodes which are arranged on the outer side of the windshield of a motor vehicle in a region which is passed over by the windshield wiper, the two main electrodes being connectable to an evaluation circuit on the motor vehicle for determining resistance of the moisture sensor as a function of a degree of moisture on the windshield;

an auxiliary electrode arranged between the two main electrodes and outside a region which is passed over by the windshield wiper, the auxiliary electrode being connectable to the evaluation circuit; and wherein the auxiliary electrode, in conjunction with the two main electrodes, serve to determine a shunt resistance formed by residues on the windshield in the region of the moisture sensor.

2. A moisture sensor according to claim 1, wherein the auxiliary electrode is arranged on the windshield approximately halfway between the two main electrodes.

3. A moisture sensor according to claim 1, wherein
the width of at least one of said main electrodes and said auxiliary electrode varies over its length.

4. A moisture sensor according to claim 3, wherein the width of said at least one electrode varies over its entire length.

5. A moisture sensor according to claim 4, wherein at least one edge of said at least one electrode is developed in undulated and/or meandering shape.

6. A moisture sensor according to claim 1, wherein
each of said electrodes is producable on the windshield by a sputter-etching process, a thick film process, a foil bearing a conductive structure, or by ion implantation.

7. A moisture sensor according to claim 1, wherein
the main electrodes and/or the auxiliary electrode extend over an edge of the windshield from outside the windshield onto the inner surface of the windshield, to which the evaluation circuit is connectable.

8. A moisture sensor according to claim 7, further comprising
a layer of solder disposed on the windshield in a region of the electrodes for a contacting of the electrodes with respective electric contacts of the evaluation circuit.

9. A moisture sensor according to claim 8, wherein
the solder layer is glass or silver frit.

10. A method of operating a moisture sensor, wherein the moisture sensor comprises:
two spaced-apart main electrodes which are arranged on the outer side of the windshield of a motor vehicle in a region which is passed over by the windshield wiper, the two main electrodes being connectable to an evaluation circuit on the motor vehicle for determining resistance of the moisture sensor as a function of a degree of moisture on the windshield;
an auxiliary electrode arranged between the two main electrodes and outside a region which is passed over by the windshield wiper, the auxiliary electrode being connectable to the evaluation circuit; and
wherein the auxiliary electrode, in conjunction with the two main electrodes, serve to determine a shunt resistance formed by residues on the windshield in the region of the moisture sensor;
the method comprising a step of arranging the auxiliary electrode in the direct vicinity of an upper edge of the windshield.

11. A method according to claim 10, wherein, in said arranging step, the auxiliary electrode is arranged completely below the windshield covering.

12. A method according to claim 10, wherein, in said arranging step, the auxiliary electrode is arranged partly below the windshield covering.

13. A method of implanting a moisture sensor on a windshield of a vehicle, wherein the moisture sensor comprises:
two spaced-apart main electrodes which are arranged on the outer side of the windshield of a motor vehicle in a region which is passed over by the windshield wiper, the two main electrodes being connectable to an evaluation circuit on the motor vehicle for determining resistance of the moisture sensor as a function of a degree of moisture on the windshield;
an auxiliary electrode arranged between the two main electrodes and outside a region which is passed over by the windshield wiper, the auxiliary electrode being connectable to the evaluation circuit; and
wherein the auxiliary electrode, in conjunction with the two main electrodes, serve to determine a shunt resistance formed by residues on the windshield in the region of the moisture sensor;
the method comprising steps of applying a layer of solder to the windshield in a region of the electrodes for a contacting of the electrodes with respective electric contacts of the evaluation circuit.

14. A method according to claim 13, wherein, in said applying step, there is a fastening of the solder layer of the windshield by ultrasonics.

15. A method according to claim 13, wherein the solder layer is glass or silver frit, and said applying step includes a burning of the frit onto the windshield.

* * * * *